March 23, 1926.
P. G. ANDRES
1,577,603
TELEPHONE RECEIVER
Filed May 8, 1922
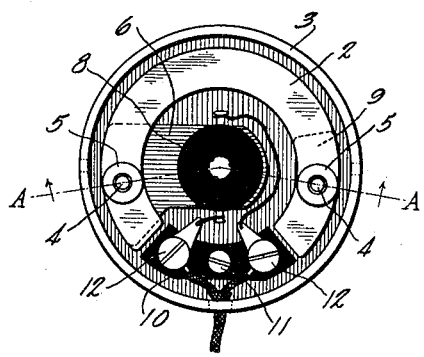
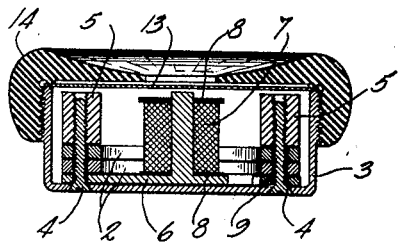
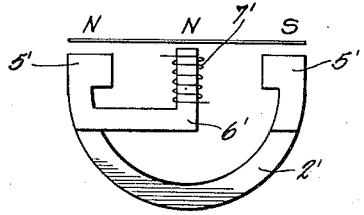
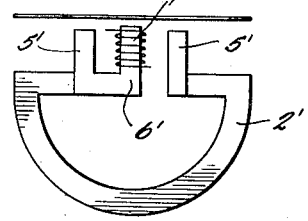
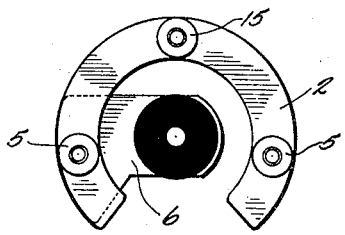
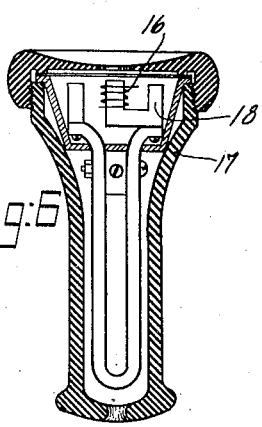
Inventor
Paul G. Andres Patented Mar. 23, 1926.                                                          1,577,603

UNITED STATES PATENT OFFICE.

PAUL G. ANDRES, OF RIVER FOREST, ILLINOIS, ASSIGNOR, BY MESNE ASSIGNMENTS, TO AUTOMATIC ELECTRIC, INC., OF CHICAGO, ILLINOIS, A CORPORATION OF DELAWARE.

TELEPHONE RECEIVER.

Application filed May 8, 1922. Serial No. 559,378.

*To all whom it may concern:*

Be it known that I, PAUL G. ANDRES, a citizen of the United States of America, and a resident of River Forest, Cook County, and State of Illinois, have invented certain new and useful Improvements in Telephone Receivers, of which the following is a specification.

My invention relates in general to telephone receivers and particularly to an improved magnetic construction therefor.

Among the objects of the invention are; to provide a novel magnetic construction of a receiver having a leakage or shunt path of low reluctance for the magnetic flux generated by voice currents in the coil thereof; to provide a single center coil receiver of high efficiency; to provide a permanent magnet receiver in which the permanent magnet will retain its magnetism, and the receiver its efficiency, regardless of a direct current flow therethrough in either direction, and to provide other details of improvement in the construction of a receiver which tend toward high efficiency in operation and low cost of manufacture.

It will be seen that a receiver having the features above described is especially adapted for use in radio telephony. It is customary in the ordinary type of radio receiving apparatus to use a polarized receiver in a circuit with the audion bulb detector in which a certain amount of direct current flows through the coil of the receiver. In the usual type of 2 coil polarized receiver the direct current may flow through the windings so as to oppose or aid the magnetic field produced by the permanent magnet. If both coils are not wound to exactly the same number of turns the coil with the greater number of turns will exert a greater pull on the diaphragm. This causes the diaphragm to be distorted and consequently when the winding is further energized with alternating current the diaphragm will not vibrate as a unit with the greatest deflection at the center.

In the receiver of new design however it does not matter whether it be poled so that the direct current aids or opposes the permanent magnet flux as the diaphragm will always be deflected greatest at the center and when alternating current is impressed the diaphragm is deflected as a unit since the pull comes at the exact center of the diaphragm. This results in the receiver talking clear and crisp.

A further advantage results in having a path for the alternating current flux, which may flow without causing demagnetization of the permanent magnet.

Referring to the drawings, I have shown in Fig. 1 a face view of a watchcase receiver embodying my invention.

Fig. 2 is a sectional view of the receiver shown in Fig. 1 looking in the direction of the arrows along the line A—A.

Fig. 3 is a diagrammatical illustration of the magnetic principles of the invention.

Fig. 4 is a diagrammatical illustration of a modification of the magnetic circuit of Fig. 3.

Fig. 5 also shows a slight modification of the magnetic circuit.

Fig. 6 shows an ordinary polarized telephone receiver embodying my invention.

I will now describe in detail the principles and construction of the receiver of my invention by referring to the above described drawings.

The receiver of Figs. 1 and 2 consists of a horseshoe permanent magnet 2 comprising two separate sections mounted in the usual aluminum, bakelite, or rubber casing 3 by means of screws 4. A pair of threaded soft iron sleeves 5 are held clamped against the opposite ends of the magnet 2 by screws 4. Under one pole of the magnet 2 and held clamped against the back of the casing 3 is a soft iron part 6 which forms an extension of one pole of magnet 2. This part 6 carries a stud in the center of the receiver which forms the core of a coil 7 having insulating washers 8 thereon to hold the winding of the coil in place. A soft iron part 9 is placed under the pole of the magnet 2 opposite the part 6 to space the magnet equally with relation to the casing, the part 9 being equal in thickness to the element 6.

A block of insulating material 10 is mounted on the casing 3 by means of a brass screw 11 between the poles of the magnet 2 to serve as a terminal block. This block 10 carries a pair of screws 12 which each hold a terminal of the coil 7 and to which the ends of the usual receiver cable may be connected as shown in Fig. 1.

A diaphragm 13 of the usual type is held in place across the top edges of the casing 3 by means of a cap 14 of insulating material which is threaded upon the rim of the casing 3.

The receiver above described is of very simple construction, and consists of few parts, the coil 7 being wound on the iron piece 6 as a unit. The permanent magnets have a leakage path for the flux passing through the extending arm 6 as well as through the diaphragm.

Referring now to Fig. 3 it will be seen that when the coil 7' is energized the magnetic flux generated in the core has a local path including the core of coil 7', the part 6', the left hand pole piece 5', and the diaphragm, thus the flux in the coil 7' does not affect the magnetism of the permanent magnet as it would if the flux were required to pass therethrough. The variations in flux caused by voice currents will follow the above described shunt path, this path being of far less reluctance than the path usually followed through the permanent magnets or through an air gap.

This magnetic structure consists of a permanent magnet having a split pole as illustrated in Fig. 3 there being two north poles and one south pole as indicated. The poles being all of soft iron it will follow that all variations of the flux generated in the coil 7' will cause the magnetic flux passing through the two north poles to shift and the flux through one north pole will decrease while the flux through the other north pole will increase. In other words all variations of flux will take place only in the series path, including the two branches of the north pole of the magnet, and the diaphragm, which path is of very low reluctance and therefore tends to highest receiving efficiency.

Fig. 4 is a diagrammatic showing of a modified magnetic circuit of the same general plan as that shown in Fig. 3, except that the shunt path is made shorter; in other words, the two poles 5' of soft iron may be brought nearer to the center of the diaphragm if desired, and may in this case be of smaller size.

Another soft iron sleeve may be included in this magnetic circuit as shown in Fig. 5 of the drawings at 15, thus tending to distribute the permanent magnet pull on the diaphragm and also to provide an additional shunt path for the variations of magnetic force.

It will be readily seen that this magnetic construction may as easily be applied to the ordinary type of telephone receiver as shown in Fig. 6 of the drawings in which case the usual type of shell and cap will be employed with a permanent magnet of standard type, the poles of the magnet will be of soft iron as described in connection with the other figures of the drawings and the coil 16 will be wound on a center pole with a shunt path for variations of flux through the cross arm 17 and the soft iron pole 18.

Having fully described and ascertained the features and aspects of my invention what I consider to be new and desire to have protected by Letters Patent will be set forth in the appended claims.

What I claim as my invention is:

1. In a telephone receiver, a diaphragm, a permanent magnet having two soft iron pole piece extensions adjacent the diaphragm and a branch from one of said extensions also adjacent the diaphragm at the geometrical center thereof, and means for producing variations in the magnetic flux in the branch and extension of which it is a part to influence the diaphragm.

2. In a telephone receiver, a diaphragm, a permanent magnet having soft iron pole pieces, a branch of one of said soft iron poles located at the geometrical center of said diaphragm and having a coil wound thereon for producing variations in the magnetic flux in said branch, and a path of low reluctance for said variations in flux including only the soft iron pole of which it is a branch and the diaphragm.

3. In a telephone receiver, a diaphragm, a permanent magnet having two like poles and only one opposite pole adjacent said diaphragm, means for producing variations in flux in one of the two like poles, and a low reluctance path for said variations in flux excluding the permanent magnet.

4. In a telephone receiver, a diaphragm, a permanent magnet having two like poles and only one opposite pole adjacent said diaphragm, means for producing variations in flux in one of the two like poles, and a low reluctance path for said variations in flux excluding the permanent magnet, a diaphragm mounted adjacent said magnet and influenced by the variations in flux in said like poles.

5. In a telephone receiver, a diaphragm, soft iron pole pieces, a permanent magnet for maintaining an initial magnetic stress on said diaphragm through said pole pieces, said magnet having two poles of like polarity and only one of opposite polarity adjacent the diaphragm, a path for the magnetic flux of said magnet including the two like poles in parallel, the diaphragm and the magnet, and means for shifting the magnetic flux from one of said parallel paths to the other to influence the diaphragm, said means acting over a magnetic path which contains only soft iron.

6. In a telephone receiver, a diaphragm, a permanent magnet, a pair of soft iron poles therefor, another soft iron pole attached to one of said magnet poles and extending in close relation to the diaphragm at the geometrical center thereof, a coil wound on said other pole piece for producing variations in the flux therein, and a path of low reluctance for said variations of flux consisting of only the center pole, the diaphragm and the pole to which the center pole is attached.

7. In a telephone receiver, a diaphragm, a permanent magnet having pole pieces disposed around the edges of said diaphragm, another pole piece attached to said magnet and extending under the geometrical center of said diaphragm and having an alternating current coil wound thereon for producing variations of magnetic flux therein, and a path of low reluctance for said variations of flux in the center pole excluding said permanent magnet.

8. In a telephone receiver, a permanent magnet, two soft iron pole pieces therefor, said poles being located beneath said diaphragm and near the circumference, a soft iron core located beneath the geometrical center of said diaphragm and attached to one of said poles, a coil on said core, the core and pole forming a soft iron magnetic path for flux set up by the coil which includes only said core, pole and diaphragm.

9. In a telephone receiver, a diaphragm, a permanent magnet, three soft iron pole pieces attached to said magnet, two being of like polarity and one of opposite polarity, a coil on one of said like poles, said coil and pole being located at the geometrical center of the diaphragm, the other like pole and the opposite pole being located near the circumference of said diaphragm, a soft iron path for the flux set up by said coil including only said like poles and diaphragm.

In witness whereof, I hereunto subscribe my name this 1st day of May, A. D., 1922.

PAUL G. ANDRES.